Figure 1:
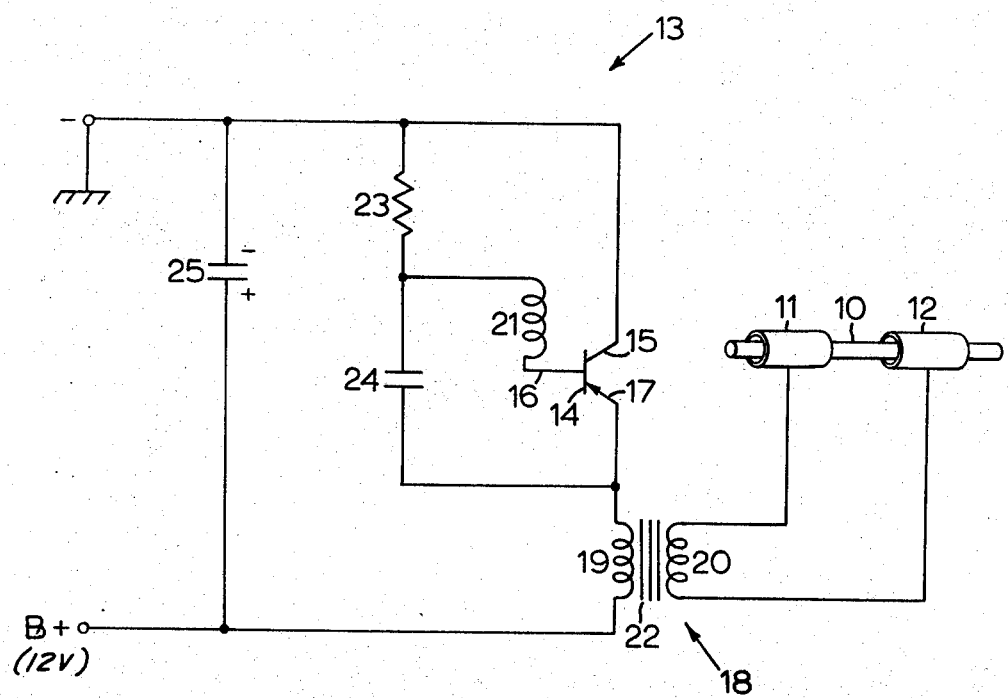

United States Patent

[11] 3,569,862

[72] Inventor George R. Johnson
 23 Sir Williams Lane, Toronto, Ontario, Canada
[21] Appl. No. 829,217
[22] Filed June 2, 1969
[45] Patented Mar. 9, 1971

[54] GAS LASER EXCITER
 2 Claims, 2 Drawing Figs.
[52] U.S. Cl. .................................................. 331/94.5, 330/4.3
[51] Int. Cl. .................................................. H01s 3/09
[50] Field of Search ...................................... 331/94.5; 250/199; 330/4.3

[56] References Cited
UNITED STATES PATENTS
3,351,870 11/1967 Goldsmith et al. ............ 331/94.5
3,424,946 1/1969 Zulinski ........................ 315/246

Primary Examiner—William L. Sikes
Attorney—Rogers, Bereskin & Parr

ABSTRACT: A gas laser having a power supply consisting of an overdriven oscillator of relatively low fundamental frequency with an output rich in harmonics. The harmonic content of the power supply output helps to initiate the excitation of the laser; after the gas has been excited the waveform of the power supply output becomes more nearly sinusoidal.

Patented March 9, 1971

3,569,862

INVENTOR.
GEORGE R. JOHNSON

BY *Rogers, Bereskin, & Parr*

GAS LASER EXCITER

This invention relates to a gas laser, and in particular to an improved exciter or power supply for energizing a low power laser plasma tube.

Low power gas lasers (e.g. He—Ne) are commonly provided with plasma tubes having internal or external electrodes. Plasma tubes having external electrodes are usually excited with a relatively high frequency radio frequency voltage. Conventional exciters are relatively expensive and consume a relatively high amount of power, in relation to the power of the laser, which is in the low milliwatt region.

According to the present invention, a preferred form of an exciter consists of an overdriven oscillator having a relatively low fundamental frequency, and an output that is rich in harmonics with considerable high frequency content. The oscillator is connected to the electrodes of the plasma tube though a transformer having a saturable core. When the exciter is energized, the rich harmonic content of the exciter output helps to initiate the excitation of the gas in the plasma tube; after the gas has been excited and coherent light begins to be emitted from the plasma tube, the waveform of the oscillator becomes more nearly sinusoidal and the harmonic content of the exciter output tends to diminish.

Objects of the present invention are to provide a gas laser having an exciter that is reliable, simple and economical to manufacture, and which consumes relatively little electrical power.

The accompanying drawing is a schematic diagram of a preferred from of a laser exciter.

Referring to the drawing, a conventional plasma tube 10 is provided with a pair of cylindrical, sleevelike electrodes 11 and 12 which are spaced-apart from each other in the manner explained below. The plasma tube 10 is filled with a suitable gas which, when excited, produces coherent light. The electrodes 11 and 12 are energized by a high voltage, alternating current signal generated by an oscillator which is generally indicated by reference numeral 13. The oscillator 13 comprises a transistor 14 having a collector electrode 15, a base electrode 16, and an emitter electrode 17. The oscillator 13 is connected to the electrodes 11 and 12 by means of a transformer 18 having a primary winding 19, a secondary winding 20, a feedback winding 21, and a saturable core 22. The emitter 17 is connected to one end of the primary winding 19, and the opposite end of the primary winding 19 is connected to a suitable positive potential (herein called B+). The feedback winding 21 is connected at one end to the base electrode 16, and its opposite end is connected to a bias resistor 23, the opposite end of which is returned to ground. The collector 15 is also connected to ground. A capacitor 24 is connected between the junction of the resistor 23 and the feedback winding 21, and the junction between the emitter electrode 17 and the primary winding 19. A capacitor 25 of relatively high capacity is connected between B+ and ground, and it serves to complete the path for alternating voltage between the collector electrode 15 and the emitter electrode 17.

Figure 2:
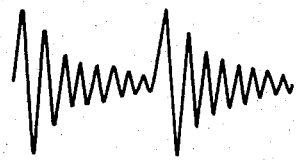

The frequency of the oscillator 13 depends upon the number of turns of the feedback winding 21 and the size of the capacitor 24. The operating conditions of the transistor 14 are selected so that the oscillator 13 is overdriven, with the result that the voltage induced in the secondary winding 20 is rich in harmonics. FIG. 2 shows a typical waveform of the voltage induced in the secondary winding 20. The fundamental frequency is typically about 30 kHz., but this is not critical and frequencies of up to about 100 kHz. could also be used. The frequency of the harmonics ranges up to about 500 kHz., and the presence of the high frequency components in the voltage in the secondary winding 20 gives it its characteristic waveform as shown in FIG. 2. The presence of the high frequency components which have very fast rise times in relation to the rise time of the fundamental frequency components, helps to initiate the plasma discharge in the plasma tube 10. It has been found that once the gas in the plasma tube 10 has been excited, the harmonics in the secondary voltage tend to be damped out, so that the voltage applied to the electrodes 11 and 12 becomes more nearly sinusoidal in shape, and its frequency is of course the fundamental frequency of the oscillator 13.

It is desirable to adjust the spacing between the electrodes 11 and 12 after the oscillator has been energized, to produce maximum output power.

In a typical oscillator made in accordance with the invention, the values of the various components were as follows:

transformer 18: primary winding 19: eight turns secondary winding 20: 1,400 turns feedback winding 21: nine turns core size: 1½× 1½(⅜ inch square cross section)

resistor 23: 750 ohms capacitor 24: .1 mfd.

capacitor 25: 12.5 mfd.

electrodes 10, 11: 4½inch long, 1 inch diameter separation of electrodes 10, 11: 1½inch B+ voltage: 12 volts transistor 14: 2N3611

With the values given above, the oscillator 13 drew 280 milliamps of current and the laser input was 2 milliwatts.

I claim:

1. A gas laser comprising a plasma tube, said plasma tube containing a gas which can be excited to produce coherent light, a pair of spaced-apart electrodes surrounding said tube for exciting said gas, and power supply means connected to said electrodes for supplying electrical power at a sufficient voltage to excite said gas, said power supply means comprising an overdriven oscillator for generating an alternating current output signal containing a fundamental component and relatively high frequency harmonics, said output signal being rich in harmonic components of frequencies in the range between the fundamental frequency and about 500 kHz., and a transformer which connects said oscillator to said electrodes, said transformer having a saturable core, said harmonic components facilitating initial excitation of said gas and said harmonic components tending to be damped out after said gas has been excited.

2. A gas laser as claimed in claim 1 wherein said oscillator is of the sinusoidal type and wherein the fundamental frequency of said oscillator is about 30 kHz.